United States Patent [19]

Instance

[11] Patent Number: 4,680,080

[45] Date of Patent: Jul. 14, 1987

[54] APPARATUS FOR PRODUCING LABELS

[76] Inventor: David J. Instance, Past Heap Farm, Pembury, Tunbridge Wells, Kent, United Kingdom

[21] Appl. No.: 781,001

[22] Filed: Sep. 27, 1985

[30] Foreign Application Priority Data

Sep. 27, 1984 [GB] United Kingdom ................. 8424449

[51] Int. Cl.[4] ............................................. B32B 31/00

[52] U.S. Cl. .................................... 156/357; 156/248; 156/301; 156/363; 156/364; 156/516; 156/552

[58] Field of Search ................................ 156/362-364, 156/356, 357, 297-299, 301-303, 552, 248, 64, 522, 510, 516

[56] References Cited

U.S. PATENT DOCUMENTS

| | | | |
|---|---|---|---|
| 3,196,069 | 7/1965 | Froehlig | 156/552 X |
| 3,819,448 | 6/1974 | Beever | 156/357 X |
| 3,869,328 | 3/1975 | Instance | 156/302 X |
| 4,249,984 | 2/1981 | VerMehrer | 156/552 |
| 4,319,948 | 3/1982 | Volkert et al. | 156/357 |
| 4,359,358 | 11/1982 | Hattemer | 156/301 X |
| 4,560,432 | 12/1985 | Instance | 156/552 X |

*Primary Examiner*—David Simmons

*Attorney, Agent, or Firm*—Birch, Stewart, Kolasch and Birch

[57] ABSTRACT

Apparatus for producing a succession of self-adhesive labels carried on a backing of release material, the apparatus comprising means for conveying along a pathway a laminar material comprising a web coated on its reverse side with a pressure sensitive adhesive and having a backing of a release material; detecting means situated along the pathway for detecting a succession of particular locations which are spaced along the length of the laminar material; an adhesive applying station situated along the pathway and including an adhesive applicator, which is operable in response to the means for detecting, for applying a layer of adhesive to a succession of particular areas along the length of the web; a label applying station situated along the pathway downstream of the adhesive applying station, the label applying station including label applying means for successively applying individual pre-printed labels to respective successive areas of adhesive so that a pre-printed label covers each area of the web to which adhesive has been applied, the label applying means being operable in response to the means for detecting; and a cutting station which is situated along the pathway either upstream or downstream of the label applying station, the cutting station including a cutter for cutting through either all of the layers of the laminar material other than the backing or, when the cutting station is downstream of the label applying station, all of those said layers and the pre-printed labels, so as to cut, respectively, either a succession of spaced label portions to which respective labels are subsequently applied at the label applying station or a succession of labels, on the backing.

20 Claims, 5 Drawing Figures

APPARATUS FOR PRODUCING LABELS

BACKGROUND TO THE INVENTION

The present invention relates to an apparatus for producing labels.

In my British Pat. No. 1475304 and my British Patent Specification Nos. 2115744 and 2115775 I describe various different labels having an increased surface area thereby enabling a greater amount of printed information to be carried by the labels than usual. Although such labels can be made individually, it is usually more convenient to arrange them as a sequence of labels carried on a backing layer of release material, preferably in the form of a reel, thereby providing a convenient supply of labels for easy and efficient application to containers to be labelled.

European Patent Specification No. 0098092 discloses a method of producing self-adhesive labels on a length of release backing material.

European Patent Specification No. 0090882 also discloses a method of producing self-adhesive labels on a length of release backing material.

U.S. Pat. Specification No. 3,682,131 discloses a control system for turning on and off an apparatus which discharges a coating liquid onto objects at a coating station.

The present invention aims to provide an apparatus for producing a succession of such labels on a backing layer of release material.

SUMMARY OF THE INVENTION

Accordingly, the present invention provides an apparatus for producing a succession of self-adhesive labels carried on a backing of release material, the apparatus comprising means for conveying along a pathway a laminar material comprising a web coated on its reverse side with a pressure sensitive adhesive and having a backing of a release material; detecting means situated along the pathway for detecting a succession of particular locations which are spaced along the length of the laminar material; an adhesive applying station situated along the pathway and including an adhesive applicator, which is operable in response to the means for detecting, for applying a layer of adhesive to a succession of particular areas along the length of the web; a label applying station situated along the pathway downstream of the adhesive applying station, the label applying station including label applying means for successively applying individual pre-printed labels to respective successive areas of adhesive so that a pre-printed label covers each area of the web to which adhesive has been applied, the label applying means being operable in response to the means for detecting, and a cutting station which is situated along the pathway either upstream or downstream of the label applying station; the cutting station including a cutter for cutting through either all of the layers of the laminar material other than the backing or, when the cutting station is downstream of the label applying station, all of those said layers and the pre-printed labels, so as to cut, respectively, either a succession of spaced label portions to which respective labels are subsequently applied at the label applying station or a succession of labels, on the backing.

The present invention further provides an apparatus for producing a succession of self-adhesive labels carried on a backing of release material, the apparatus comprising means for conveying along a pathway a laminar material comprising a succession of label base portions, each of which is coated on its reverse side with a pressure sensitive adhesive, and having a backing of release material; detecting means situated along the pathway for detecting a succession of particular locations which are spaced along the length of the laminar material; an adhesive applying station situated along the pathway and including an adhesive applicator, which is operable in response to the means for detecting, for applying a layer of adhesive to a particular area on each label base portion; and a label applying station situated along the pathway downstream of the adhesive applying station, the label applying station including label applying means, which are operable in response to the means for detecting, for successively applying individual pre-printed labels to respective successive layers of adhesive so that a pre-printed label covers each area of each label base portion to which adhesive has been applied.

The backing carrying the resultant labels can be wound into a reel to form a supply roll or can be folded to form a fan-folded supply of labels.

Preferably, the pre-printed labels are a folded sheet and envelope or a multiple-ply label.

Preferably, the folded sheets and envelopes applied to the web are those described in my British Patent No. 1475304 and consist of a sheet (e.g. a sheet of printed instructions) and an envelope therefor, both formed from a single folded sheet, e.g. of paper, wherein the single sheet is divided into at least two parallel rows of three rectilinear panels each, the two outer panels of a first row being separated from the corresponding two outer panels of the next row by cuts and the middle panels of the said first and next rows being joined to one another through a line of perforations aligned with the cuts, the single sheet being so folded that the panels of the first row form the envelope and the sheet, e.g. of instructions, is composed of the panels of the next row and of any further rows which are folded to lie adjacent one face of the middle panel of the first row, whereby the sheet, e.g. of instructions, is enclosed in the envelope but can be removed and detached therefrom by tearing along the line of perforations, or are those described in my British Patent Specification No. 2115744 and consist of a sheet (e.g. a sheet of printed instructions) and an envelope therefor, both formed from a single folded sheet, e.g. of paper, wherein the single sheet is divided into at least two parallel rows of three rectilinear panels each, the panels of the first row being separated from the corresponding panels of the next row by a line of perforations and each of the two outer panels of the first row of panels having a portion cut away inwardly from the respective outer edge of the sheet adjacent the line of perforations so that the line of perforations stops short of the outer edges of the sheet, the single sheet being so folded that the panels of the first row form the envelope, and the sheet is composed of the panels of the next row and of any further rows which are folded to lie adjacent one face of the corresponding panels of the first row, whereby the sheet is enclosed in the envelope but can be removed and detached therefrom by tearing along the line of perforations.

Examples of the multiple-ply labels suitable for application to the web are those described in my British Patent Specification No. 2115775 and consist of a longitudinal strip divided into a series of panels by a plurality of transverse fold lines, the first two of the panels forming a front cover and a back cover respectively for enveloping the remaining panel or panels of the strip when folded, the transverse fold lines being spaced along the strip so that upon folding of the strip the said remaining panel or panels is or are folded to lie over the back cover and is or are in turn covered by folding of the front cover about the fold line between the front and back covers and wherein the front cover may extend beyond the area occupied by the back cover, and a band of adhesive is provided on the inner face of the free outer edge of the front cover panel adjacent to said outer edge for securing the outer edge of the front cover either to the back of the folded panel or panels along a region adjacent the fold line which lies between the back cover and the said remaining panel or panels, or to the surface of a support web for carrying the label, the front cover panel being arranged to be torn or otherwise opened to give access to the interior of the folded label.

Alternatively, the pre-printed labels are lithographically printed labels as described in my British Patent Specification No. 2122968.

In addition, the apparatus of the present invention may be employed to make labels as disclosed in my British Patent Application No. 8415853. That Application discloses and claims a label for affixing to a container comprising a longitudinal strip divided into a series of panels by a plurality of transverse fold lines, the first two panels forming a front cover and a back cover respectively for enveloping the remaining panel or panels of the strip when folded, the transverse fold lines being spaced along the strip so that upon folding of the strip the said remaining panel or panels is or are folded to lie over the back cover and is or are in turn covered by folding of the front cover about the fold line between the front and back covers; and a support web to which the said back cover is adhered, the support web being dimensioned to extend laterally at least beyond the edge of the back cover which occurs at the fold line between the back cover and the remaining panel or panels, the front cover panel being dimensioned so that its free outer edge opposite to the fold line between the front and back cover panels extends beyond the area of the support web occupied by the back cover thereby to form an overlapping portion, the area of the support web which in use lies below the said overlapping portion being provided with adhesive for securing the front cover panel in a closed condition, and the front cover panel being arranged to be torn or otherwise opened to give access to the interior of the folded label.

DESCRIPTION OF THE PREFERRED EMBODIMENTS

Figure 1:
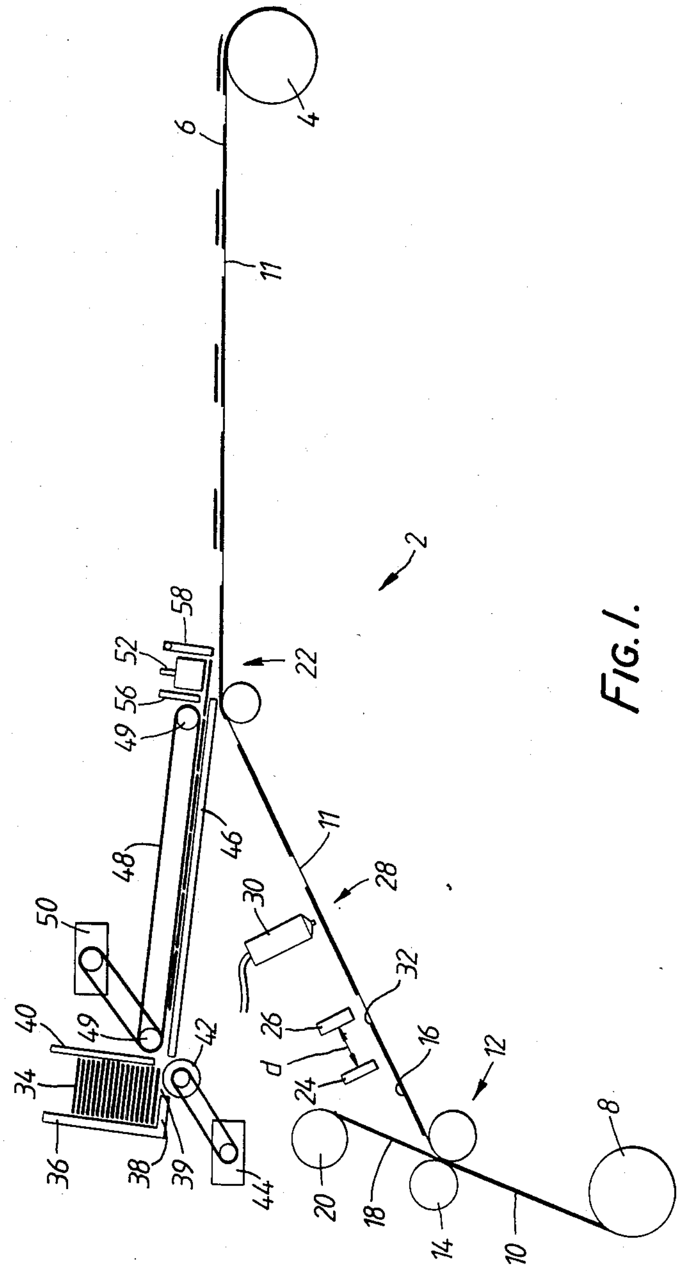
FIG. 1 is a diagrammatic elevational view of an apparatus for producing labels in accordance with a first embodiment of the present invention.

Referring to FIG. 1 there is shown an apparatus, designated generally as 2, for preparing a reel 4 carrying a succession of self-adhesive labels 6. The reel 4 of labels is produced starting from a reel 8 of a laminar material 10 commonly known in the art as self-adhesive stock or pressure-sensitive stock. Such laminar material usually consists of a web of paper of indeterminate length coated on its reverse side with a layer of pressure-sensitive adhesive, with the adhesive side of the paper being protected with a backing layer 11 of a release material such as silicone-faced backing paper.

The upper surface of the web of paper is printed along its length with a cuccoccion of images, each of which is to constitute the front surface of a respective resultant label 6. Alternatively, the web of paper may not be so printed; such an arrangement is employed when the front surface of the resultant self-adhesive labels 6 is to be composed only of the front surface of a pre-printed label which is adhered to the web of paper in the manner which is described hereinbelow.

The laminar material 10 is unwound from the reel 8 and guided by appropriate guide rollers (not shown) to a die-cutting station 12 where all the layers of the laminar material 10 other than the backing layer 11 are cut by a die-cutting roller 14 to form a succession of spaced label base portions 16 on the backing layer 11. The waste web remnant 18 consisting of portions of the web outside the label base portions 16 is removed from the web and wound up on a roll 20. Removal of the waste web remnant 18 leaves a succession of spaced apart label base portions 16 on the backing layer 11.

Instead of a cutting station being provided in the apparatus, the laminar material 10 on reel 8 may consist of a succession of pre-cut label base portions 16 on the backing layer 11. The label base portions 16 have been previously cut by a die-cutter. The absence of the cutting station results in the preferred apparatus of the present invention being simpler in construction and easier to operate since there is no need periodically to remove the roll 20 of waste web remnant.

The backing layer 11 with the label base portions 16 thereon is then conveyed to a pre-printed label applying station 22 and passes, in turn, a "START" sensor 24, a "STOP" sensor 26 and an adhesive-applying station 28 including an adhesive applicator 30.

START sensor 24 includes a photodetector which scans the label base portions 16 and the backing layer 11 as the laminar material 10 passes thereunder. The photodetector in the START sensor 24 is arranged to detect a given point on each label base portion 16. Preferably the photodetector in the START sensor 24 detects the leading edge 32 of each label base portion 16. The photodetector can detect relatively easily the difference in contrast (i.e. the reflected light which is received by the photodetector) between the backing layer 11 and the label base portions 16. Alternatively, the photodetector in the START sensor 24 can detect a mark which is printed at a particular position along the length of each label base portion 16. When the START sensor 24 detects the said given point, an electrical signal is sent therefrom to initiate the operation of the adhesive applicator 30, either immediately or after a predetermined delay of time. The adhesive applicator 30 deposits a layer of adhesive across a particular portion of the width of the label base portion 16 and as each label base portion 16 passes under the adhesive applicator 30 a band of adhesive is applied thereto. The adhesive may be be any suitable adhesive for paper, such as, for example, PVA (poly vinyl alcohol) adhesive. The adhesive is applied to a label base portion 16 which is downstream along the laminar material 10 from that label base portion 16 which was detected by the START sensor 24.

The adhesive applicator 30 may include an applicator head which is elongate and extends transverse the direction of movement of the web. A row of holes is provided along the length of the applicator head. When adhesive is to be applied to one of the label base portions 16, adhesive is expressed through the holes for a given period onto the moving label base portion 16. This causes a plurality of elongate beads of adhesive of given length to be formed along the length of, and across a desired portion of the width of, the label base portion 16.

In a further arrangement of the adhesive applicator 30, expressing of the adhesive through the holes may be made intermittent and, in addition, the particular holes through which adhesive is expressed may be varied for any cycle of adhesive application. This results in dots of adhesive being deposited onto a label base portion in a manner similar to dot-matrix printing whereby a desired pattern of dots of adhesive is applied to each label base portion 16. An advantage of that arrangement is that the total amount of adhesive which is applied to each label base portion 16 is reduced, resulting in reduced costs.

A further advantage is that the density of adhesive applied to any particular area on the label base portions can be strictly controlled by controlling what proportion of the holes in the applicator head are operational at any particular period in the cycle of application of adhesive to the label base portion.

When the labels to be made by the apparatus of the present invention are the resealable labels which are disclosed in my British patent Application No. 8415853 (in particular FIGS. 4 and 5 thereof), the density of adhesive applied to the label base portion, which acts as the said support web for the folded label, may be varied so that the density of adhesive applied to that part of the label base portion to which the back cover of the folded label is adhered is greater than that applied to that part of the label base portion to which the said overlapping portion of the front cover panel of the folded label is adhered. For example, the density of adhesive dots applied to the second-mentioned part may be half that of the first-mentioned part of the label pase portion. This ensures that the overlapping portion, which is coated with a layer of a material which renders the paper hydrophobic, can readily be pulled away from the label base portion, so as to open the label, without any tearing of the label occurring.

Yet another advantage is that the amount of adhesive applied and the areas to which the adhesive is applied can be easily varied so that it is ensured that when a pre-printed label is applied to the label base portion, no excess adhesive is squeezed out from between the edges of the pre-printed label and label base portion. It has been found that if adhesive is squeezed out in that manner so that adhesive is deposited onto the uncovered part of the label base portion, when the resultant labels on the backing layer are wound into a reel, adjacent layers of the reel tend to become adhered together. This is obviously a considerably disadvantage and leads to difficulties when the labels are to be removed from the reel.

STOP sensor 26 also includes a photodetector which is similar in operation and construction to that included in START sensor 24. The photodetector in STOP sensor 26 detects the same or a different given point on each label base portion 16 as the photodetector in START sensor 24. When the STOP sensor 26 detects the said given point, an electrical signal is sent therefrom to terminate the operation of the adhesive applicator 30, either immediately or after a predetermined delay of time. Thus each label base portion 16 has applied thereto a layer of adhesive of predetermined dimensions. The label base portions 16, each of which has a layer of adhesive thereon, are then conveyed to the label applying station 22.

In the preferred arrangement, when the START and STOP sensors 24, 26 detect the same given point the START sensor 24 and the STOP sensor 26 are separated, along the direction of travel of the label base portions 16, by a distance d which is equal to the length along the label base portions 16 of each layer of adhesive.

It will be apparent to those skilled in the art that the separation of the START sensor 24, STOP sensor 26 and adhesive applicator 30, as well as any time delays in initiating and terminating the operation of the adhesive applicator 30, can be varied as desired. In the illustrated arrangement, the START sensor 24 and the STOP sensor 26 detect the given point on one label base portion 16 to operate the adhesive applicator 30 to apply adhesive to another label base portion 16 which is downstream of that former label base portion 16. If desired, the START sensor 24, the STOP sensor 26 and the adhesive applicator 30 could be arranged to act on only one label base portion at a time. Alternatively, the adhesive applicator 30 could be positioned upstream of the START sensor 24 and the STOP sensor 26.

A plurality of pre-printed labels 34 are held as a stack thereof in a magazine 36. The pre-printed labels may be, for example, multiple-ply labels as described in my British Patent Specification No. 2115775 and my British Patent Application No. 8415853 or they may take the form of a sheet of instructions and an envelope therefor as described in my British Patent Specification No. 2115744 or in my British Pat. No. 1475304. Alternatively, the pre-printed labels may be lithographically printed labels as disclosed in my British Patent Specification No. 2122968.

The bottom of the magazine includes an opening 39 in the bottom wall 38 which extends as far as one of the side walls 40 of the magazine 36. A rotatable cylinder 42 which is hollow and has a plurality of holes provided in the cylindrical wall of the cylinder 42, which holes pass through the thickness of the cylindrical wall, is mounted beneath the opening 39 with the axis of the cylinder being perpendicular to the stock of pre-printed labels 34. The cylinder 42 extends into the opening 39 so that the bottom pre-printed label 34 in the stock rests against the uppermost surface portion of the cylinder 42. A vacuum is continuously maintained in the cylinder 42 by evacuating means (not shown), e.g. a vacuum pump, so that that pre-printed label 34 which is at the bottom of the stack has that surface thereof which is adjacent the cylinder 42 sucked by the vacuum against the upper surface of the cylinder 42. The strength of the vacuum is such as substantially not to deform the bottom pre-printed label 34 but so as to ensure that the bottom pre-printed label 34 can be moved, by rotation of the cylinder 42 by a rotary drive means 44, out of the opening 39 in the magazine 36 against the friction between the said pre-printed label 34 and the next-to-bottom pre-printed label 34. The cylinder 42 is rotated intermittently in order successively to feed out pre-printed labels 34 from the stack in the magazine 36. The rotary drive means 44 is preferably an electric motor which drives the cylinder 42 either via a belt or directly.

The pre-printed labels 34 which are fed out from the magazine 36 by the rotation of the vacuum cylinder 42 are deposited onto and travel along the upper surface of a plate 46. The pre-printed labels 34 are conveyed along the plate 46 by means of a rotatable endless belt 48 which is mounted on two spaced rollers 49 and which is driven by a drive means 50 which drives one of the rollers 49. The drive means 50 is an electric motor which drives the roller 49 either via a belt or directly. The endless belt 48 extends along the length of the plate 46 with the bottom surface of the endless belt 48 being located parallel to and slightly above the upper surface of plate 46 so that a pre-printed label 34 is held firmly between plate 46 and endless belt 48 as it moves along the plate 46. The endless belt may be made of any suitable material such as, for example, rubber. The endless belt 48 is rotated in an anti-clockwise direction in the apparatus of FIG. 1. The endless belt 48 is rotated intermittently and in synchronism with the rotation of the vacuum cylinder 42, so that when a pre-printed label 34 is fed out from the magazine 36 by the rotation of the vacuum cylinder 42, the rotating endless belt 48 engages the top surface of the pre-printed label 34 and urges the pre-printed label 34 along the plate 46. The duration of the rotation cycle of the vacuum cylinder 42 and the endless belt 48 can be such so as to provide along the plate 46 a succession of pre-printed labels 34 in abutting relationship. Alternatively, the duration of the rotation cycle may be such so as to have the succession of pre-printed labels in overlapping relationship.

Figure 2:
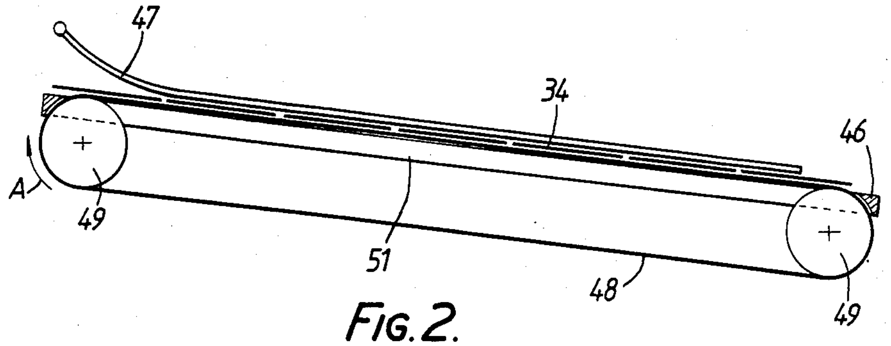
FIG. 2 is a part-sectional elevational view of an alternative pre-printed label feed arrangement for use in the apparatus of FIG. 1.

In an alternative label feed arrangement, as is shown in FIG. 2, there is provided a leaf spring 47 which is mounted above the plate 46 and is arranged to urge the pre-printed labels 34 downwardly against the upper surface of the plate 46. The plate 46 is provided along its length and through its thickness with an elongate notch 51. The endless belt 48 is mounted below and parallel to the plate 46 so that the upper portion of the endless belt 48 is aligned along and extends through the notch 51. The leaf spring 47 urges any pre-printed label 34 thereunder against the upper surface of the endless belt 48.

Movement of the endless belt 48 in the direction of the arrow A causes corresponding movement of each pre-printed label 34 which is on the plate 46 towards the label applying station 22.

Figure 3:
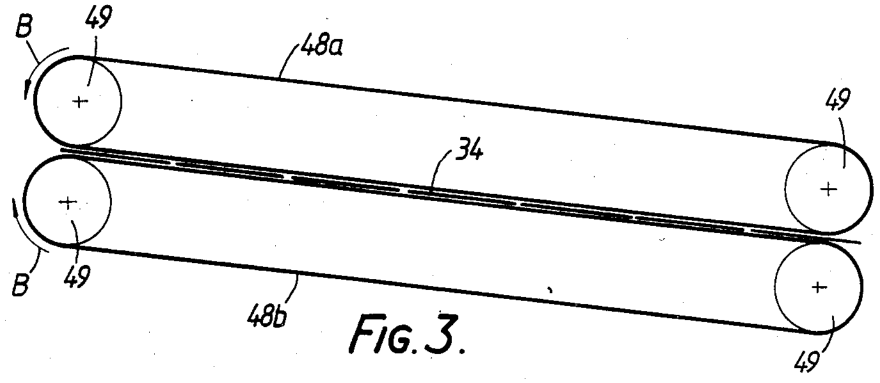
FIG. 3 is an elevational view of another alternative pre-printed label feed arrangement for use in the apparatus of FIG. 1.

In a further alternative arrangement, as is shown in FIG. 3, there may be provided as the label delivering means two endless belts 48*a*, 48*b* which are mounted one above the other to provide two opposing belt surfaces. Pre-printed labels 34 are squeezed between the opposing surfaces of the two endless belts 48*a*, 48*b*. The two endless belts 48*a*, 48*b* are operated in synchronism and rotate in opposite directions as shown by the arrows B so that rotation of the two endless belts 48*a*, 48*b* causes the displacement of any pre-printed label 34 therebetween from the magazine 36 towards the label applying station 22.

Referring again to FIG. 1, a ram 52 for pushing successively the pre-printed labels 34 onto respective layers of adhesive on respective label base portions 16 as the pre-printed labels 34 reach the downstream end of the plate 46 in turn is mounted slightly spaced from that end of the plate 46.

Preferably the ram 52 consists of one or more rollers. More preferably, the ram 52 consists of one or more rollers which are driven when the ram 52 pushes the pre-printed labels 34 as aforesaid, the speed of rotation of the surface of the rollers being the same as the surface speed of movement of the web.

The label applying station 22 includes control means for controlling the operation of the rotary drive means 44 for the vacuum cylinder 42; control means for controlling the operation of the drive means 50 for the endless belt 48; and the ram 52, and is situated at the downstream end of the plate 46. The label applying station 22 includes a label detector which is a photodetector 56 which is situated at, and directed towards the upper surface of the downstream end of plate 46. The photodetector 56 detects whether or not a pre-printed label 34 is underneath the photodetector 56 at the downstream end of the plate 46 by sensing the amount of light reflected into the photodetector 56 from the plate 46 or from a pre-printed label 34. When a pre-printed label 34 is under the photodetector 56, the amount of light reflected from the pre-printed label 34 into the photodetector 56 is different than that reflected from the plate 46 when a pre-printed label 34 is not under the photodetector 56. When the photodetector 56 detects that a pre-printed label 34 is not under the photodetector 56 at the end of the plate 46, the photodetector 56 emits an electrical signal which switches ON the rotary drive means 44 for the vacuum cylinder 42 and the drive means 50 for the endless belt 48. Thus pre-printed labels 34 are fed along the plate 46 from the magazine 36 towards the photodetector 56. The leading pre-printed label 34 passes along the plate 46 under the photodetector 56 and then under the ram 52.

The leading edge of the leading pre-printed label 34 then contacts a front-edge detector 58 which is situated downstream of the ram 52 and extends across the pathway of the pre-printed labels 34. The front-edge detector 58 acts as a switch when the front-edge of the leading pre-printed label 34 contacts the front-edge detector 58. When so contacted, the front-edge detector 58 switches OFF the rotary drive means 44 for the vacuum cylinder 42 and the drive means 50 for the endless belt 48. Thus no more pre-printed labels 34 are fed along the plate 46 when the leading pre-printed label 34 contacts the front-edge detector 58 which is at the downstream end of the plate 46. The front edge detector 58 also sends an electrical signal to the ram 52 which signal is an ENABLE signal for enabling the ram 52 to operate. The ENABLE signal does not initiate the operation of the ram 52 but rather allows the ram 52 to operate.

The operation of the ram 52 is initiated by an electrical signal which is sent to the ram 52 from START sensor 24. The START sensor 24 sends the signal to the ram 52 when the START sensor 24 initiates the operation of the adhesive applicator 30, either immediately or after a predetermined delay of time. In operation, ram 52 moves downwardly towards and against the upper surface of the leading pre-printed label 34 so as to push the leading pre-printed label 34 towards the moving succession of label base portions 16 on the backing layer. The arrangement is such that the leading edge of the leading pre-printed label 34 is pushed by the ram 52 onto an adhesive layer on a respective label base portion 16. The ram 52 continues to act on the leading pre-printed label 34 and the leading pre-printed label 34 is carried away from the ram 52 by the moving adhesive layer. When the ram 52 consists of one or more undriven rollers, the translational movement of the leading pre-printed label 34 as it is carried away along the web causes rotation of the one or more rollers. The provision of one or more rollers tends to minimise the frictional resistance acting on the leading pre-printed label 34 as it moves away from the label applying station. When the one or more rollers are driven, the one or more rollers help to overcome the frictional resistance and drive the leading pre-printed label 34 onto the adhesive layer on the moving web. The ram 52 pushes the leading pre-printed label 34 beneath the level of the bottom of the front-edge detector 58 so that the adhered pre-printed label 34 can pass beneath the front-edge detector 58. The ram 52 is arranged to operate when the leading edge of the leading pre-printed label 34 substantially coincides with the leading edge of the layer of adhesive on the respective label base portion 16. The length of the layer of adhesive substantially corresponds to the length of the pre-printed labels 34.

When the composite label 6, consisting of a label base portion 16 with a pre-printed label 34 adhered thereto, moves away from the label applying station 22, the photodetector 56 senses that there is no pre-printed label 34 at the end of plate 46 and so initiates the operation of the vacuum cylinder 42 and the endless belt 48 to deliver another pre-printed label 34 from the magazine 36 onto the upstream end of plate 46 and the new leading pre-printed label 34 on the plate 46 to the label applying station 22. As the next label base portion 16 passes under the label applying station 22 operation of the ram 52 is initiated as described hereinabove so that the next pre-printed label 34 is adhered to the next label base portion 16 to form the next composite label 6. The resultant succession of composite labels 6 is wound onto reel 4.

If desired, the succession of composite labels 6 on the backing layer 11 may be passed through a pair of nip-rollers (not shown) situated downstream of the label applying station prior to being wound onto reel 4. The nip rollers help to ensure that the pre-printed labels 34 are firmly adhered to the label base portions 16.

It will be appreciated that the operation of the START sensor 24 and the STOP sensor 26 can be varied as desired so as to apply the adhesive layer at any desired location on each label base portion 16 and so as to ensure that the ram 52 operates only when each adhesive layer is at the correct position under the label applying station 22 whereby the pre-printed label 34 is correctly applied to the label base portion 16. In order to provide that variation, the positions of the START sensor 24 and the STOP sensor 26 along the direction of the moving label base portions 16 can be altered and/or there can be a predetermined time delay between those sensors 24,26 detecting the given point on the moving label base portions 16 and acting to initiate the adhesive applicator 30 and the ram 52. Furthermore, the length of time that the ram 52 operates to push the pre-printed label 34 onto the label base portions 16 in each cycle can be varied as desired depending upon the length of the respective pre-printed labels 34 which are being adhered to the label base portions 16.

In an alternative arrangement, instead of employing START sensor 24 and STOP sensor 26, the apparatus can employ a START sensor 24 which is coupled to an encoder (not shown). When the START sensor 24 detects the given point on a respective label base portion 16, an electrical signal is sent to the encoder which acts to measure the distance travelled by the moving web from a given start position. After the web has travelled a prescribed distance, the encoder activates the adhesive applicator 30 for a given period.

For a given web speed, the adhesive applicator 30 operates for a given period to apply a given length of adhesive onto the respective label base portion 16. The encoder may employ a disc which has a plurality (e.g. 1500) of equally-spaced circumferential marks thereon and is connected to the drive mechanism for the web. When the web moves, the disc spins at a speed corresponding to the speed of the web. A sensor is arranged to detect the circumferential marks and to output a pulse for each detected mark. The pulse train so outputted is employed to generate a signal which is sent to the adhesive applicator 30. The signal causes the adhesive applicator 30 to operate for a predetermined number of pulses and at a particular time in the pulse train. In a similar manner, the ram 52 is caused to operate for a predetermined period and at a predetermined time after the actuation of the START sensor 24. After a predetermined number of pulses have been emitted from the encoder, the encoder stops operation until it is actuated again by the START sensor 24 when the START sensor 24 detects the succeeding label base portion 16.

With such an arrangement, there is no need for a STOP sensor 26. The speed of the moving web, and thereby the rate of application of the pre-printed labels 34 to the label base portions 16, can easily be varied. Furthermore, when a different length of pre-printed labels 34, and therefore a different length of adhesive layer, is to be employed, or when the position of application of the pre-printed labels 34 to the label base portions 16 is to be varied, there is no need to move the START sensor 26 along the direction of the moving web. An operator merely needs to adjust the encoder so that the operation of the adhesive applicator 30 and the ram 52 is activated after a different number of pulses have been inputted into the encoder and for a different length of time.

Figures 4, 5:
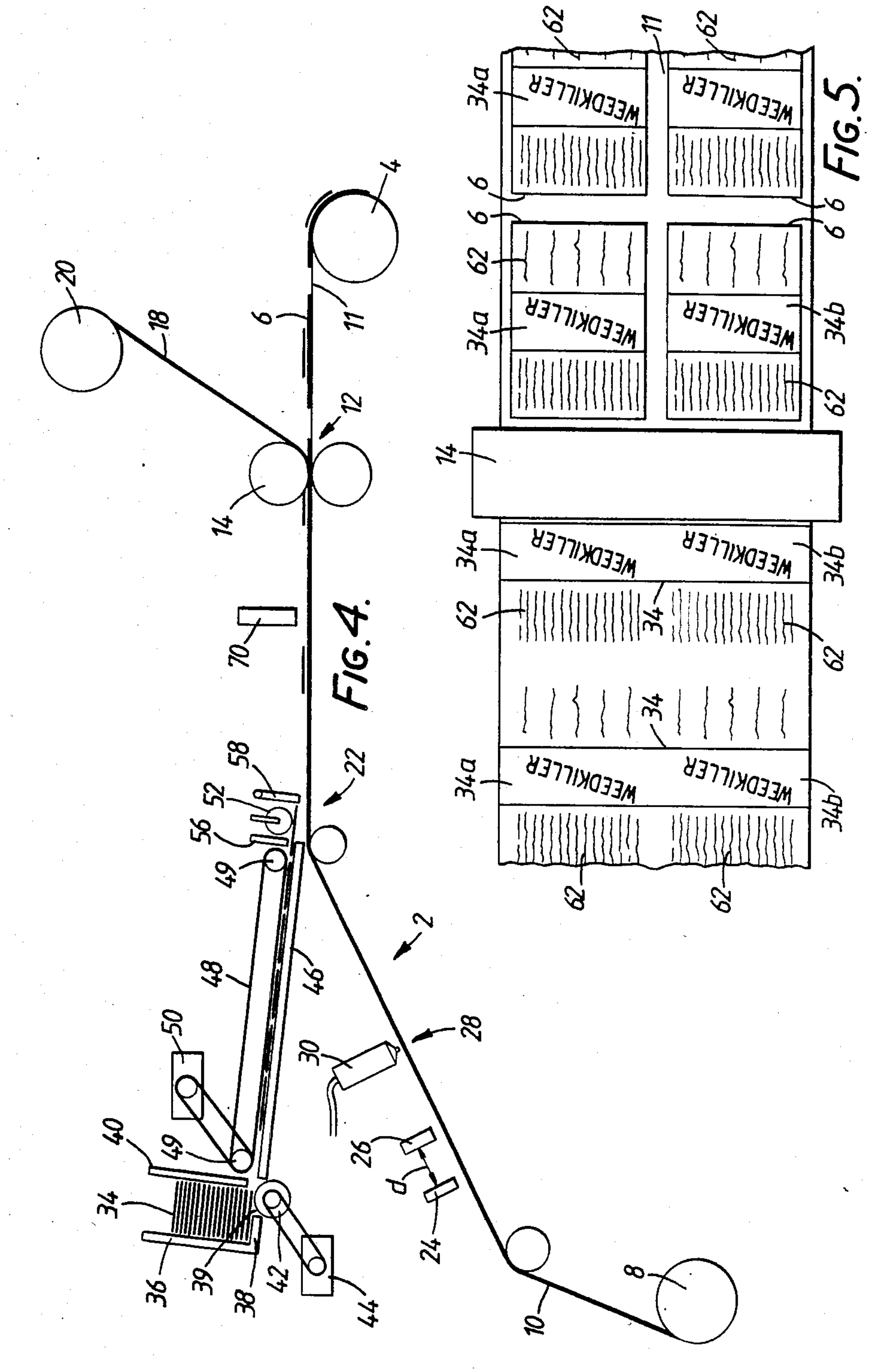
FIG. 4 is a diagrammatic elevational view of an alternative apparatus for producing labels in accordance with a second embodiment of the present invention.
FIG. 5 illustrates an arrangement at the die-cutting station of the apparatus of FIG. 4.

Referring to FIG. 4, there is shown a second embodiment of an apparatus for preparing a reel carrying a succession of self-adhesive labels. The apparatus is similar to that shown in FIG. 1, and like parts are designated by like reference numerals. However, in the apparatus of FIG. 4, the die-cutting station 12 is not upstream of the label applying station 22 and the adhesive-applying station 28, but rather the die-cutting station 12 is downstream of the label and adhesive-applying stations 22,28.

The upper surface of the laminar material 10 is printed along its length with a succession of images, each of which is to constitute the front surface of a respective resultant label 6. The upper surface of the laminar material 10 may have one or more of those images across the width of the upper surface, so that a corresponding number of the resultant labels 6 may be provided across the width of the web.

The laminar material 10 of self-adhesive stock is fed directly from reel 8 thereof to the adhesive applying station 28. At the adhesive applying station 28 the adhesive layer is applied to the upper surface of the laminar material 10 as described hereinabove. However, since the laminar material 10 has not been die-cut, there are no label base portions on the backing layer 11 of release material but rather a continuous web of paper on the backing layer 11. Consequently, the START sensor 24 and the STOP sensor 26 must be arranged to detect printed marks which are provided in succession along the length of the web of paper to initiate and to terminate application of adhesive to the web of paper.

The laminar material 10 is then fed to the label-applying station 22 where pre-printed labels 34 are applied to the web of paper in the manner described hereinabove. If desired, the label feed arrangement shown in FIG. 2 or FIG. 3 may be employed in the apparatus of FIG. 4.

When there is more than one printed image across the width of the web of paper, each pre-printed label 34 consists of a corresponding number of label portions which are arranged in a line so that when the pre-printed label 34 is adhered to the web of paper, the pre-printed label 34 extends across the width of the web of paper, with each label portion of the pre-printed label 34 being adhered in registry with a respective image on the web of paper.

The laminar material 10 with the succession of pre-printed labels 34 applied thereto is then fed to the die-cutting station 12 which includes a die-cutting roller 14 coupled with a backing roller 60. At the die-cutting station 12, the die-cutting roller 14 cuts through the web of paper and the pre-printed labels 34 as far as the backing layer 11. The backing layer 11 is not cut by the die-cutting roller 14, thereby to provide a succession of spaced individual composite labels 6 on the backing layer 11, which is then wound up onto a reel 4. The waste web remnant 18 consisting of portions of the web and the pre-printed labels 34 outside the composite labels 6 is removed from the backing layer 11 and wound up on a roll 20.

In the apparatus of FIG. 4, the ram 52 is shown as a roller, which is a preferred form of the ram 52 as is discussed with reference to the apparatus of FIG. 1. FIG. 5 shows the arrangement at the die-cutting station 12 when two composite labels 6 are to be provided across the width of the backing layer 11. For the sake of clarity, the waste web remnant 18 and roll 20 are not shown. The web of paper has a plurality of printed images 62 thereon. Two images 62 are provided across the width of the web and the images 62 are provided in succession along the length of the web. Each image 62 is to constitute the front of a respective label 6. A pre-printed label 34 has been adhered across the width of the web of successive locations along the length of the web. In the arrangement of FIG. 5, the pre-printed label 34 is disposed generally at the centre of each image 62 so that in each resultant label 6 the pre-printed label 34 is generally at the centre thereof. The pre-printed label 34 has two label portions ***34a*,*34b*, each of which is associated with a respective image 62. The laminar material 10 with the pre-printed labels then passes under die-cutting roller 14. The web of paper and the pre-printed labels 34 are cut so that a succession of pairs of composite labels 6 are provided on the backing layer 11. Each composite label 6 includes a respective image 62 and a respective label portion *34a*,*34b***.

It is often found in practice that stretching (or creep) of the laminar material 10 occurs when it is being conveyed under tension at the web speeds which are employed in the labelling apparatus of the present invention. Such stretching can result in the die-cutting being performed inaccurately along the length of the laminar material 10. In order to overcome that problem, in a preferred arrangement of the apparatus of FIG. 4 there is provided between the label applying station 22 and the die-cutting station 12 a photodetector 70. The photodetector 70 is similar to those photodetectors 24,26,56 employed at the adhesive- and label-applying stations 28,22. The photodetector 79 is arranged so as to detect the leading edge of a pre-printed label 34 as it passes thereunder towards the die-cutting station 12. In this arrangement, the die-cutting roller 14 is not free rolling, and the rotation thereof is adjustable in response to the output from the photodetector 70. For example, the die-cutting roller 14 may be driven by a motor (not shown) and the output of the photodetector 70 may be employed to adjust the drive of the motor. The output of the photodetector 70 is used to control the rotation of the die-cutting roller 14 in response to the position of the pre-printed labels 34 on the web before the die-cutting station 12 so as either to advance or delay the cutting action of the die-cutting roller 14. In that manner, correct die-cutting of the composite labels 6 is ensured, irrespective of whether of not any stretching of the laminar material 10 has occurred.

A great advantage of the apparatus of FIG. 4 is that a plurality of composite labels 6 may be provided across the width of the backing layer 11 of release material. This greatly multiplies the production rate of the labels 6, without requiring an increase in web speed which could result in production problems.

The preferred apparatus of the present invention produces high quality, accurately dimensioned composite self-adhesive labels 6 on a releasable backing layer 11 in reel form.

What I claim is:

1. Apparatus for producing a succession of self-adhesive labels carried on a backing of release material, the apparatus comprising means for conveying along a pathway a laminar material comprising a succession of label base portions, each of which is coated on its reverse side with a pressure sensitive adhesive, and having a backing of a release material; detecting means situated along the pathway for detecting a succession of particular locations which are spaced along the length of the laminar material; an adhesive applying station situated along the pathway and including an adhesive applicator, which is operable in response to the means for detecting, for applying a layer of adhesive to a particular area on each label base portion; and a label applying station situated along the pathway downstream of the adhesive applying station, the label applying station including label applying means, which are operable in response to the means for detecting, for successively applying individual pre-printed labels to respective successive layers of adhesive so that a pre-printed label covers each area of each label base portion to which adhesive has been applied.

2. Apparatus according to claim 1, wherein the detecting means includes a first location sensor which is arranged to initiate the operation of the adhesive applicator upon detecting each of the particular locations.

3. Apparatus according to claim 2, wherein the detecting means further includes a second location sensor which is arranged to terminate the operation of the adhesive applicator upon detecting each of the particular locations.

4. Apparatus according to claim 2 further comprising switching means which are switched ON in response to the first location sensor detecting each of the particular locations and are operable in response to the distance travelled by the web to switch OFF the adhesive applicator after the web has travelled a particular distance.

5. Apparatus according to claim 1, wherein the label applying means includes a reciprocable ram which can act on the upper surface of a pre-printed label and push the lower surface of the said pre-printed label into engagement with a respective one of the adhesive layers and means for delivering individual pre-printed labels from a stack thereof to the ram, the means for delivering including an elongate plate which extends between the stack and the ram and an endless belt which is mounted on rollers and one portion of which extends generally parallel to and spaced from the plate, the endless belt being rotatable whereby, in use, rotation of the endless belt can move any pre-printed label which is between the belt and the plate along the plate towards the ram.

6. Apparatus according to claim 5, wherein initiation of the operation of the ram to push a pre-printed label as aforesaid is in response to the detection of each of the said particular locations by the first location sensor.

7. Apparatus according to claim 5, wherein the ram consists of one or more rollers.

8. Apparatus according to claim 5, further comprising a first label sensor which senses when a pre-printed label is not at that end of the plate which is near to the ram and is arranged to cause in response thereto initiation of the rotation of the endless belt to deliver a pre-printed label to the said end of the plate and a second label sensor which senses when a pre-printed label is in position beneath the ram for application to the web and is arranged in response thereto to cause termination of the rotation of the endless belt.

9. Apparatus according to claim 8, wherein the second label sensor is also arranged to enable the ram to operate when the second label sensor senses a pre-printed label as aforesaid.

10. Apparatus according to claim 5 further comprising a magazine for holding the stack of pre-printed labels, the magazine being situated at that end of the plate which is remote from the ram, the bottom of the magazine has an opening therein through which pre-printed labels from the stack can be fed out individually, the magazine having provided at the opening a rotatable cylinder, the upper surface of which can engage the bottom pre-printed label in the stack whereby rotation of the cylinder can feed out the said pre-printed label from the stack between the plate and the endless belt.

11. Apparatus for producing a succession of self-adhesive labels carried on a backing of release material, the apparatus comprising means for conveying along a pathway a laminar material comprising a web coated on its reverse side with a pressure sensitive adhesive and having a backing of a release material; detecting means situated along the pathway for detecting a succession of particular locations which are spaced along the length of the laminar material; an adhesive applying station situated along the pathway and including an adhesive applicator, which is operable in response to the means for detecting, for applying a layer of adhesive to a succession of particular areas along the length of the web; a label applying station situated along the pathway downstream of the adhesive applying station, the label applying station including label applying means for successively applying individual pre-printed labels to respective successive areas of adhesive so that a pre-printed label covers each area of the web to which adhesive has been applied, the label applying means being operable in response to the means for detecting; and a cutting station which is situated along the pathway either upstream or downstream of the label applying station, the cutting station including a cutter for cutting through either all of the layers of the laminar material other than the backing or, when the cutting station is downstream of the label applying station, all of those said layers and the pre-printed labels, so as to cut, respectively, either a succession of spaced label portions to which respective labels are subsequently applied at the label applying station or a succession of labels, on the backing.

12. Apparatus according to claim 11, wherein the detecting means includes a first location sensor which is arranged to initiate the operation of the adhesive applicator upon detecting each of the particular locations.

13. Apparatus according to claim 12, wherein the detecting means further includes a second location sensor which is arranged to terminate the operation of the adhesive applicator upon detecting each of the particular locations.

14. Apparatus according to claim 12 further comprising switching means which are switched ON in response to the first location sensor detecting each of the particular locations and are operable in response to the distance travelled by the web to switch OFF the adhesive applicator after the web has travelled a particular distance.

15. Apparatus according to claim 11, wherein the label applying means includes a reciprocable ram which can act on the upper surface of a pre-printed label and push the lower surface of the said pre-printed label into engagement with a respective one of the adhesive layers and means for delivering individual pre-printed labels from a stack thereof to the ram, the means for delivering including an elongate plate which extends between the stack and the ram and an endless belt which is mounted on rollers and one portion of which extends generally parallel to and spaced from the plate, the endless belt being rotatable whereby, in use, rotation of the endless belt can move any pre-printed label which is between the belt and the plate along the plate towards the ram.

16. Apparatus according to claim 15, wherein initiation of the operation of the ram to push a pre-printed label as aforesaid is in response to the detection of each of the said particular locations by the first location sensor.

17. Apparatus according to claim 15, wherein the ram consists of one or more rollers.

18. Apparatus according to claim 15, further comprising a first label sensor which senses when a pre-printed label is not at that end of the plate which is near to the ram and is arrangd to cause in response thereto initiation of the rotation of the endless belt to deliver a pre-printed label to the said end of the plate and a second label sensor which senses when a pre-printed label is in position beneath the ram for application to the web and is arranged in response thereto to cause termination of the rotation of the endless belt.

19. Apparatus according to claim 18, wherein the second label sensor is also arranged to enable the ram to operate when the second label sensor senses a pre-printed label as aforesaid.

20. Apparatus according to claim 15 further comprising a magazine for holding the stack of pre-printed labels, the magazine being situated at that end of the plate which is remote from the ram, the bottom of the magazine has an opening therein through which pre-printed labels from the stack can be fed out individually, the magazine having provided at the opening a rotatable cylinder, the upper surface of which can engage the bottom pre-printed label in the stack whereby rotation of the cylinder can feed out the said pre-printed label from the stack between the plate and the endless belt.

* * * * *